May 30, 1933.　　　G. LOENING　　　1,911,577
AIRPLANE
Filed June 14, 1932　　3 Sheets-Sheet 1
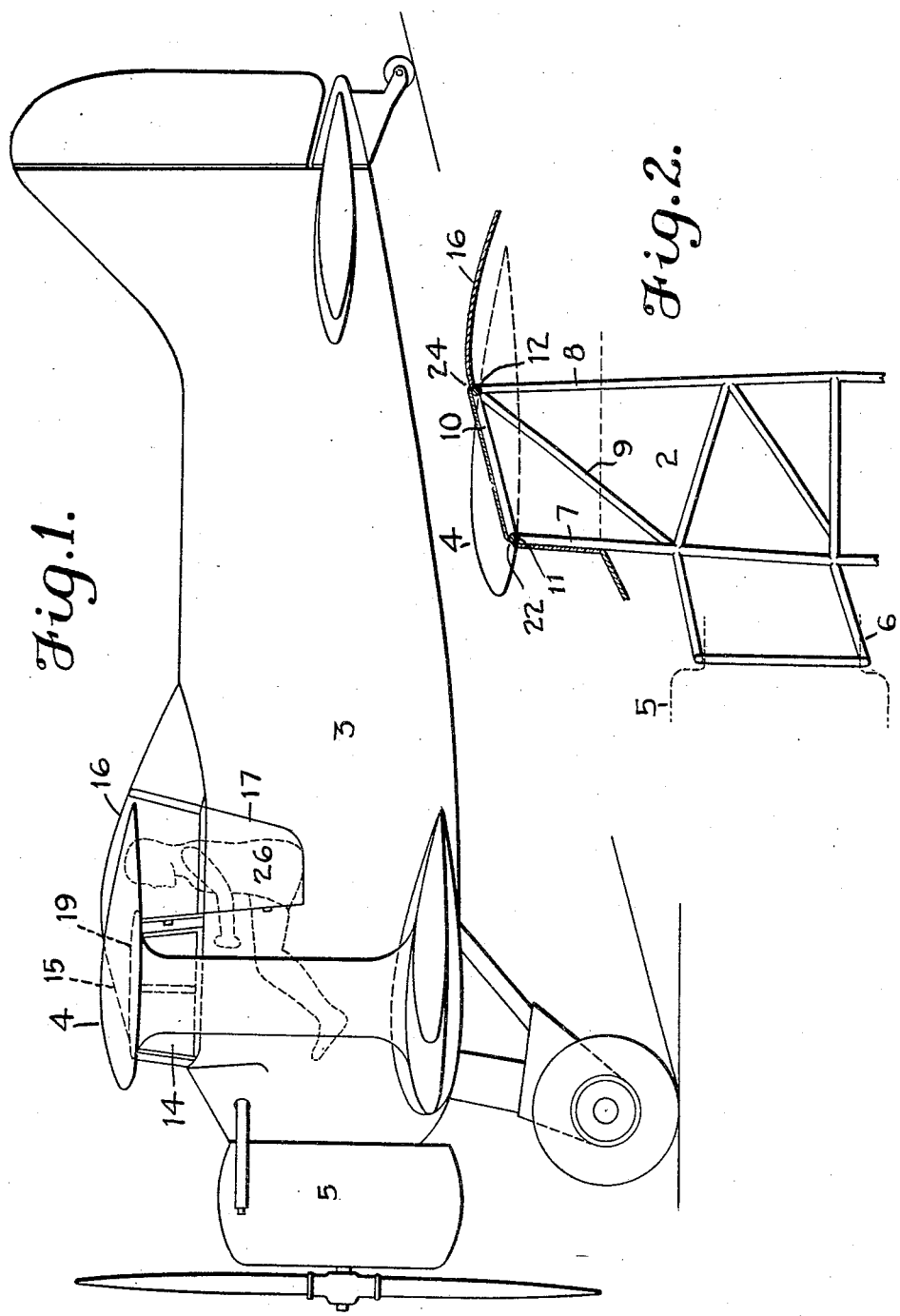
INVENTOR
Grover Loening
BY
ATTORNEY

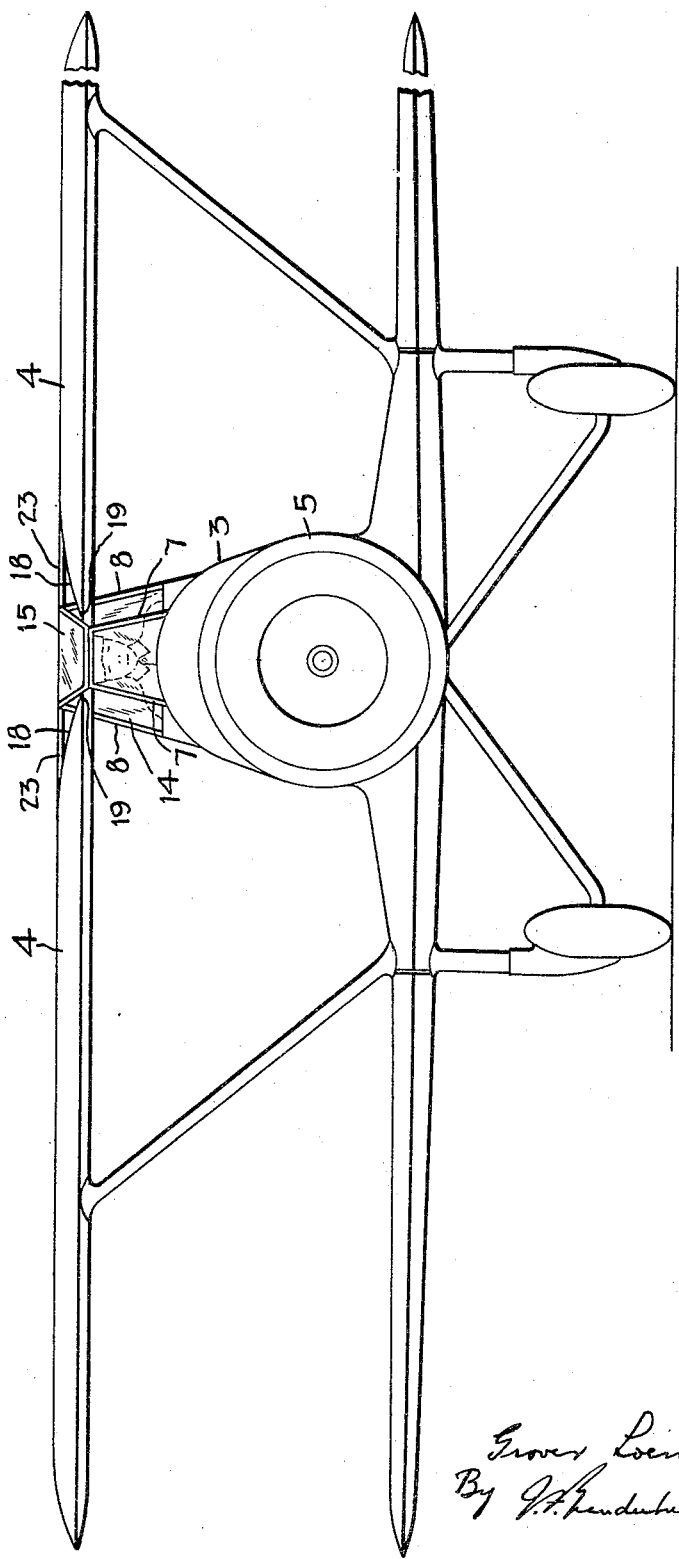

May 30, 1933.  G. LOENING  1,911,577
AIRPLANE
Filed June 14, 1932   3 Sheets-Sheet 3
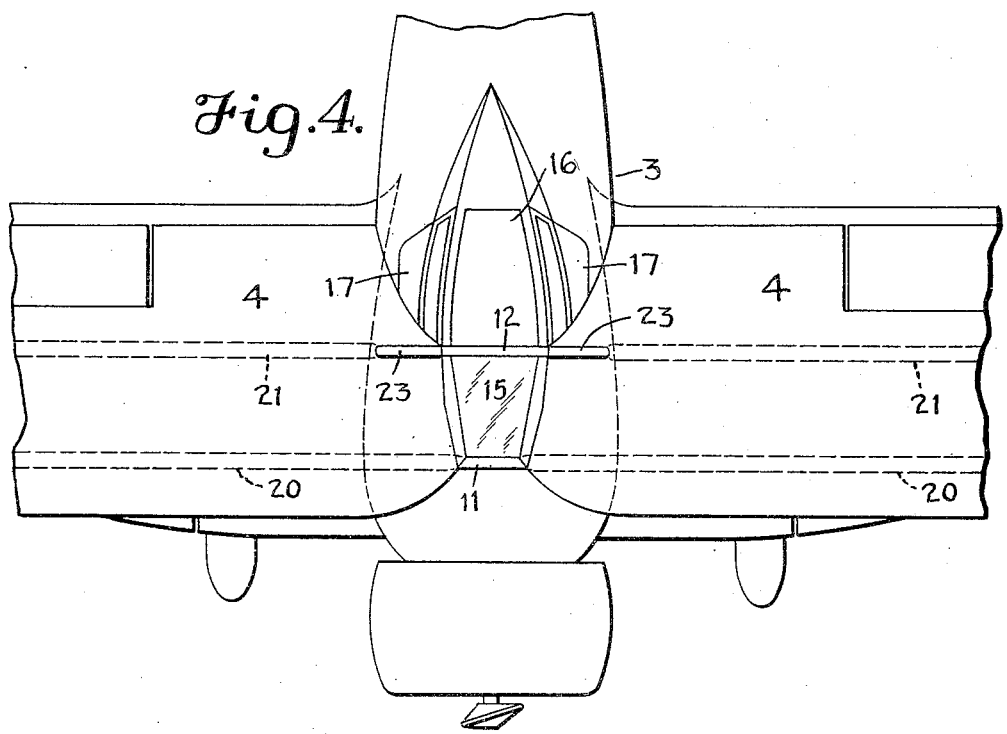
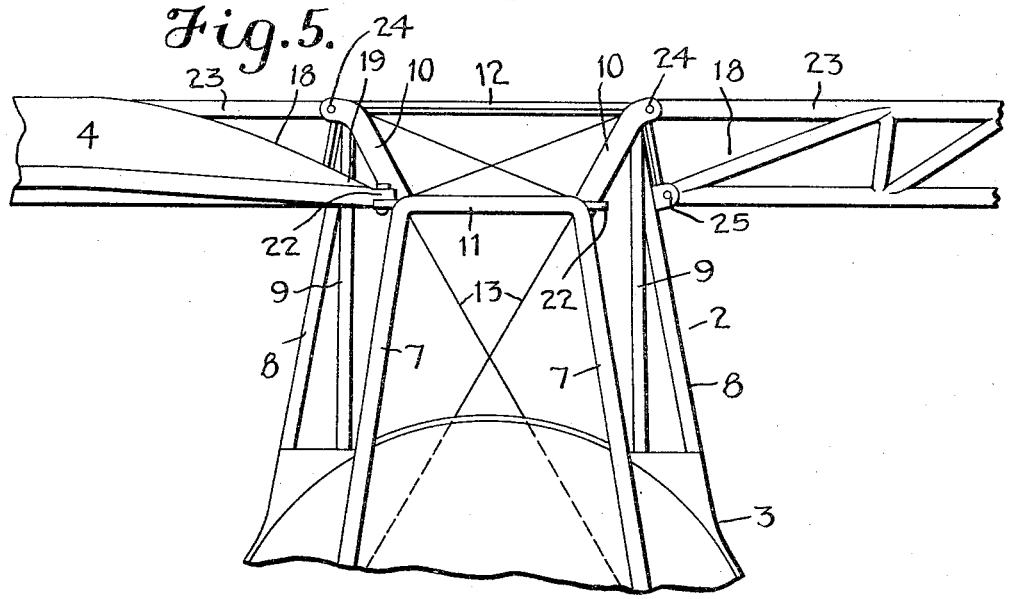
INVENTOR
Grover Loening
BY
ATTORNEY Patented May 30, 1933

1,911,577

UNITED STATES PATENT OFFICE

GROVER LOENING, OF MILL NECK, NEW YORK, ASSIGNOR TO GROVER LOENING AIRCRAFT COMPANY, INC., OF GARDEN CITY, LONG ISLAND, NEW YORK, A CORPORATION OF NEW YORK

AIRPLANE

Application filed June 14, 1932. Serial No. 617,097.

The invention relates to airplanes, and more especially to a plane of the tractor class in which the pilot's head is near the wing and behind and above the engine.

The object of this invention is to give the pilot improved vision, downward and forward, downward and to the side, upward and also laterally over the wing. The construction herein described enables the pilot to sit higher than he could otherwise, the position which is made possible being such that he has an increased angle of vision forward over the engine and that he can see both under and over the wings. The invention involves a combination, with an inward and downward tapering or sloping of the wings at the roots, of a center-section construction in which the connections for the wings across the top of a body structure, and the necessary struts and wires to brace them, are enclosed in transparent material to form a windshield or totally enclosed cabin as desired. The rear connection is preferably at the top of the wing, or at the top of the rear spar, whereas the front connection is preferably at the bottom of the wing or the forward spar.

In the accompanying drawings forming part hereof:

Fig. 1 is a side elevation of a biplane embodying the invention;

Fig. 2 is a fragmentary sectional view taken in a central vertical longitudinal plane;

Fig. 3 is a front elevation, with portions of the wings at one side broken out;

Fig. 4 is a fragmentary plan view on a larger scale; and

Fig. 5 is a fragmentary front elevation on a still larger scale, with the glazed cabin enclosure and roofing omitted. This view shows at the left side the connection between a front spar and the body structure, and at the right side, which may be understood as being a section through this wing, the connection between a rear spar and the structure.

A center-section framework 2 is secured in the fuselage 3, and extends somewhat above the latter to the upper wing 4. The right and left wings are connected to the top of this structure, which also carries the engine 5 on a forwardly extending lower portion 6.

While the specific construction of the framework 2 may be varied, the illustrated form may be described as comprising in its upper portion approximately upright side members 7 and 8, diagonals 9, side top members 10, front and rear transverse top members 11 and 12, and stay wires 13. Between the fuselage proper and the upper wings, the space included within this framework is housed by a cabin enclosure 14 providing transparent windows around the front and sides. The top of the pilot's cabin is also glazed, and is preferably formed by a transparent pane or sheet 15 covering the top of the framework between the right and left wings. A bulged cover 16, affording additional head-room for the pilot, is shaped in good flow-line continuation with the upwardly and rearwardly inclined glazed top 15, the surface of this cover declining rearward to a stream-line junction with the top of the fuselage. In some instances an open cockpit may be provided at the region occupied by this cover. Entrance to the cabin is provided by one or more doors 17, at either or both sides of the cabin, and for greater convenience of the pilot in getting in and out the cover 16 may be made slidable in a known manner.

The upper surfaces of the inboard portions or roots of the right and left wings 4 slope gently inward and downward at 18 to narrow edges 19 adjoining the structure 2, the inboard ends of the front and rear spars 20 and 21 conforming to this taper. The points 22 where the front spars are attached to or form a junction with the structure 2 are preferably at the ends of the cross member 11 and are approximately at the bottoms of these spars. The rear cross member 12 is at a higher elevation, near or even above the top of the wing, and the tops of the rear spars 21 are connected with this part of the structure 2 by extensions 23, which project from the wing covering and are attached at 24. For additional strength the rear spars also have lower attachments 25 on the rear side members 8.

The construction permits the pilot's place 26 in the cabin to be sufficiently high so that he can easily see over and under the wing. His relatively high position gives him an excellent angle of visibility forward and downward over the engine 5, while by raising his eyes, and straightening up if necessary, he gets a good view laterally over the tapered wings. The elevation of the member 12 and the rear spar extensions 23 places this part or these parts so that they are not in the way of the head of the pilot and do not interfere with his vision.

I claim:

1. In an airplane having a body with an engine at its front, wings with front and rear spars, and a pilot's place below the wing and above and behind the engine, the combination with the wings tapered at the roots, of an upwardly extending body structure having a rear cross member above the bottom of the wing, and external extensions passing between the tops of the rear wing spars and the top of said structure.

2. In an airplane having a body with an engine at its front, wings with front and rear spars, and a pilot's place below the wing and above and behind the engine, the combination with the wings tapered at the roots, of an upwardly extending body structure having a rear cross member above the bottom of the wing, and external extensions passing between the tops of the rear wing spars and the top of said structure, said rear wing spars also having lower connections with the sides of said structure.

3. An airplane having a fuselage, an engine at the front end of the fuselage, top wings having tapered roots, a center-section structure extending upward to the wings, a glazed cabin enclosure surrounding and covering the space within said structure, and connections between said tapered wings and said structure and across the top of the latter, the rearward of the cross connections being approximately at the top of the wing, the pilot's place in the cabin being so disposed that the pilot can see both under and over the wing without having his view obstructed by said cross connections.

GROVER LOENING.